(12) United States Patent
Jang et al.

(10) Patent No.: US 8,674,569 B2
(45) Date of Patent: Mar. 18, 2014

(54) MOTOR HAVING PIN GUIDE FOR FIXING MAG MATE TERMINALS AND METHOD FOR MANUFACTURING THE SAME

(75) Inventors: Jung Cheol Jang, Gwangju (KR); Wang Gyu Jeong, Gwangju (KR); Jae Hyun Han, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 76 days.

(21) Appl. No.: 13/365,471

(22) Filed: Feb. 3, 2012

(65) Prior Publication Data

US 2013/0043742 A1  Feb. 21, 2013

(30) Foreign Application Priority Data

Aug. 18, 2011  (KR) .................. 10-2011-0082162

(51) Int. Cl.
*H02K 11/00* (2006.01)
*H02K 1/04* (2006.01)
*H02K 1/00* (2006.01)
*H02K 1/06* (2006.01)

(52) U.S. Cl.
USPC ......... 310/71; 310/43; 310/194; 310/216.105

(58) Field of Classification Search
USPC .............................. 310/43, 71, 194, 216.105
See application file for complete search history.

(56) References Cited

U.S. PATENT DOCUMENTS

2008/0073986 A1* 3/2008 Lee ................................. 310/71

FOREIGN PATENT DOCUMENTS

| CN | 101588089 A1 | * 11/2009 |
| JP | 10284193 A | * 10/1998 |
| JP | 2004-135416 A | 4/2004 |
| JP | 2007-006603 A | 1/2007 |
| JP | 2009-131127 A | 6/2009 |
| KR | 10-2001-0011780 A | 2/2001 |
| KR | 1020010011780 A1 | * 2/2001 |
| KR | 10-2004-0065529 A | 7/2004 |
| KR | 10-2008-0078948 A | 8/2008 |
| KR | 20-2009-0007696 A | 7/2009 |
| KR | 10-2011-0039785 A | 4/2011 |

OTHER PUBLICATIONS

Macine Translation CN101588089 (2009).*

* cited by examiner

*Primary Examiner* — Tran Nguyen
*Assistant Examiner* — Jose Gonzalez Quinones
(74) *Attorney, Agent, or Firm* — Sherr & Jiang, PLLC

(57) ABSTRACT

The present invention relates to a motor including: a housing formed in such a manner as to locate a stator assembly inside a mold and to perform an insert injection molding, the housing having a hollow portion formed at the inside thereof and power terminal pins exposed above the hollow portion; a printed circuit board adapted to mount an integrated circuit device thereon and having a shaft insertion hole formed at the center thereof and power terminal pin holes formed at the corresponding positions to the power terminal pins; and an end cover adapted to be coupled to the housing in such a manner as to be located on the top of the printed circuit board and having a motor shaft coupling portion formed at the center thereof.

5 Claims, 5 Drawing Sheets

MOTOR HAVING PIN GUIDE FOR FIXING MAG MATE TERMINALS AND METHOD FOR MANUFACTURING THE SAME

CROSS REFERENCE TO PRIOR APPLICATIONS

The present application claims priority under 35 U.S.C. §119 to Korean Patent Application No. 10-2011-0082162 (filed on Aug. 18, 2011), which is hereby incorporated by reference in its entirety.

BACKGROUND OF THE INVENTION

1. Field of the Invention

The present invention relates to a motor, and more particularly, to a motor that is provided to improve the structure of a housing of a brushless DC (BLDC) motor, thereby preventing a printed circuit board from being damaged upon making the motor, achieving easy assembly, and reducing manufacturing cost.

2. Background of the Related Art

Generally, the motors used for an air conditioner external unit or a refrigerator in BLDC motors often do not work since they have leakage or corrosion through the permeation of rainwater or moisture into a housing, and thus, the housing is made of a bulk molding compound (BMC) resin by means of insert injection molding.

A conventional motor, which has a housing made of the BMC resin by means of the insert injection molding, is disclosed in Korean Patent Application Laid-Open No. 10-2011-0039785. According to the structure of the conventional motor, in a state where a printed circuit board is disposed on one side of a stator, the injection is performed with the BMC resin to make a housing.

By the way, in the state where the printed circuit board is disposed, if the stator is located inside a mold to perform the insert injection molding, the injection molding work is carried out on relatively high temperature conditions, such that the devices mounted on the printed circuit board may be broken or damaged. Like this, if the devices on the printed circuit board are broken or damaged, since the housing is molded of the BMC resin together with the stator and the printed circuit board, all of them should be thrown away. Accordingly, the entire manufacturing cost is undesirably increased.

In the state where the electrical connection of the printed circuit board is finished, furthermore, a radiation plate for radiating the heat generated from an integrated circuit device is mounted, and after that, the insert injection molding is carried out, thereby making it difficult to perform the assembly work and causing the manufacturing process to be complicated.

To solve the above-mentioned conventional problems, thus, the inventors propose to a motor having a structure in which resin molding is not carried out in a state where the printed circuit board is coupled to the stator.

SUMMARY OF THE INVENTION

Accordingly, the present invention has been made in view of the above-mentioned problems occurring in the prior art, and it is an object of the present invention to provide a motor that is provided to improve the structure of a housing of a BLDC motor.

It is another object of the present invention provide a motor that achieves easy assembly.

It is still another object of the present invention to provide a motor that reduces manufacturing cost.

It is yet another object of the present invention to provide a motor that is simple in structure and enhances heat radiation efficiency.

To accomplish the above objects, according to an aspect of the present invention, there is provided a motor including: a housing formed in such a manner as to locate a stator assembly inside a mold and to perform an insert injection molding, the housing having a hollow portion formed at the inside thereof and power terminal pins exposed above the hollow portion; a printed circuit board adapted to mount an integrated circuit device thereon and having a shaft insertion hole formed at the center thereof and power terminal pin holes formed at the corresponding positions to the power terminal pins; and an end cover adapted to be coupled to the housing in such a manner as to be located on the top of the printed circuit board and having a motor shaft coupling portion formed at the center thereof.

According to the present invention, desirably, the stator assembly includes: a stator core; an upper insulator adapted to be coupled to the upper side of the stator core and having mag mates disposed on one side of the top portion thereof in such a manner as to insert mag mate terminals connected to coils thereinto; and a lower insulator adapted to be coupled to the lower side of the stator core, and the power terminal pins are connected to the top portions of the mag mate terminals.

According to the present invention, desirably, the motor further includes power terminal connectors adapted to be inserted into the power terminal pin holes, each power terminal connector comprising: an insertion portion coupled to each power terminal pin hole; a connection portion electrically connected to the insertion portion and the printed circuit board; and a pin pressing and fitting portion formed inside the insertion portion so as to press and fit each power terminal pin.

According to the present invention, desirably, the printed circuit board further includes a thermal conductor disposed on the top of the integrated circuit device, the thermal conductor having a height capable of being brought into contact with the end cover.

According to the present invention, desirably, the housing includes seating grooves formed along the inner peripheral wall of the upper portion of the hollow portion in such a manner as to fixedly insert edge portions of the printed circuit board thereinto.

To accomplish the above objects, according to another aspect of the present invention, there is provided a method for manufacturing a motor including the steps of: providing a state assembly having at least one or more mag mates disposed on one side thereof and mag mate terminals adapted to be inserted into the mag mates; disposing the stator assembly into a mold to make a housing by means of insert injection; coupling a printed circuit board to the top of a hollow portion of the housing; and coupling an end cover to the top of the printed circuit board.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a motor according to the present invention will be in detail given with reference to the attached drawing.

Figure 1:
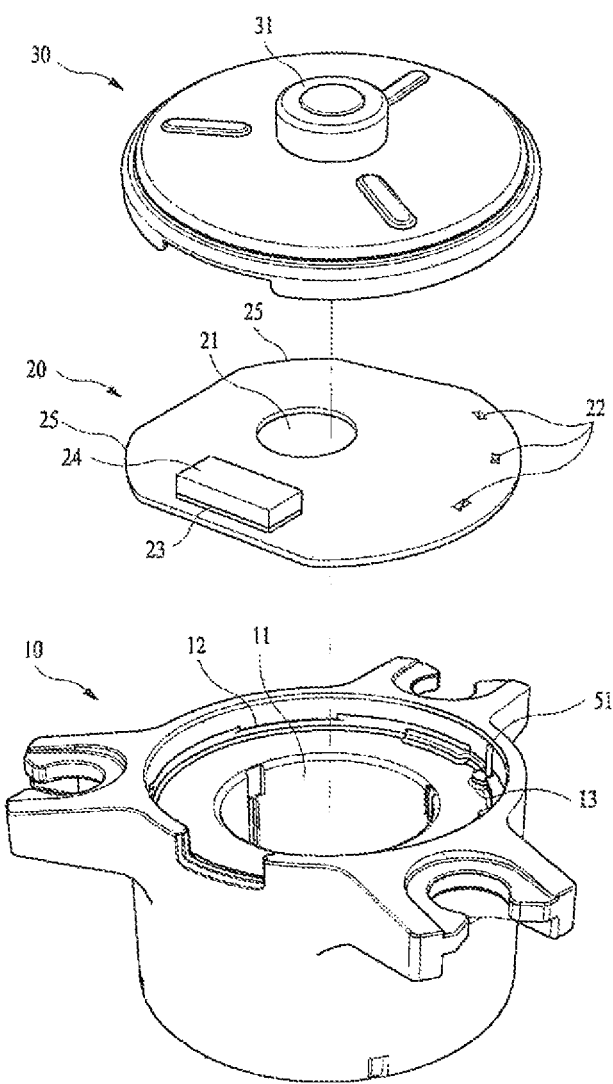
FIG. 1 is an exploded perspective view showing a structure of a motor according to the present invention.

FIG. 1 is an exploded perspective view showing a structure of a motor according to the present invention.

As shown in FIG. 1, the motor according to the present invention largely includes a housing 10 adapted to locate a stator assembly at the inside thereof, a printed circuit board 20 on which a variety of devices are mounted; and an end cover 30 adapted to cover the top side of the printed circuit board 20.

After the stator assembly is located inside a mold, the housing 10 is made of BMC resin by means of injection molding. The housing 10 has a hollow portion 11 formed at the center thereof, and a rotor (not shown) is insertedly disposed into the hollow portion 11. The rotor is connected on the center thereof to a motor shaft in such a manner as to be rotated together with the motor shaft, and one end of the motor shaft is passed through the lower side of the housing 10 in such a manner as to be exposed to the outside, while the other end thereof is being passed through a shaft insertion hole 21 of the printed circuit board 20 in such a manner as to be seated on a motor shaft coupling portion 31 of the end cover 30.

The hollow portion 11 of the housing 10 is coupled on the top side thereof to the printed circuit board 20, and so as to perform the coupling with the printed circuit board 20, thus, the housing 10 has at least one or more seating grooves 12 formed on the top side of the hollow portion 11, that is, along the inner side periphery thereof. The seating grooves 12 are formed to seat edge portions 25 of the printed circuit board 20 thereon, thereby fixing the printed circuit board 20 thereto.

So as to conduct power supply to the stator assembly disposed in the resin molded housing 10, it is necessary to perform the electrical connection with the printed circuit board 20. Thus, at least one or more power terminal pins 51 are formed protrudedly from the stator assembly to the inside of the housing 10. Generally, three power terminal pins for the connection to the three phases u, v and w are needed. The power terminal pins 51 are exposed through power terminal pin exposing portions 13 formed on the housing 10. The power terminal pin exposing portions 13 are the positions through which the power terminal pins 51 are exposed, which are formed upon the injection molding of the housing 10, and the number of power terminal pin exposing portions 13 is the same as the power terminal pins 51. In FIG. 1, three power terminal pins 51 are provided. The exposed power terminal pins 51 are located inside power terminal pin holes 22 formed on the printed circuit board 20 if the printed circuit board 20 is coupled to the housing 10.

The printed circuit board 20 has the shaft insertion hole 21 formed on the center thereof in such a manner as to pass the motor shaft therethrough. Further, the printed circuit board 20 is coupled to the top side of the hollow portion 11 of the housing 10. At this time, the power terminal pins 51 are insertedly coupled into the power terminal pin holes 22.

Figure 4:
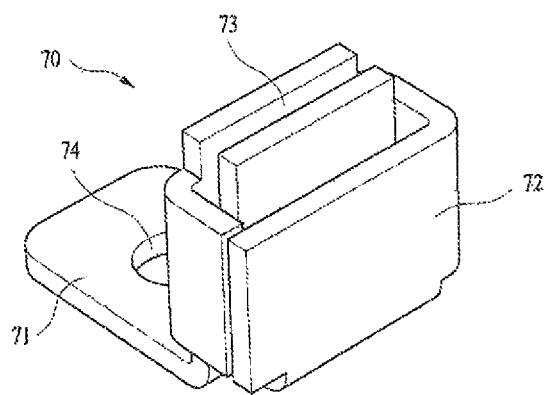
FIG. 4 is a perspective view showing one power terminal connector of the motor according to the present invention.

So as to easily perform the electrical connection to the power terminal pins 51, desirably, the power terminal pin holes 22 are coupled to power terminal connectors (see a reference numeral 40 in FIG. 4). The printed circuit board 20 has an integrated circuit device 23 mounted thereon, and so as to radiate the heat generated from the integrated circuit device 23, a thermal conductor 24 is mounted on the top of the integrated circuit device 23. The thermal conductor 24 has a height capable of being brought into contact with the end cover 30. Desirably, the thermal conductor 24 is made of conductive silicone and is adapted to rapidly transmit the heat generated from the integrated circuit device 23 to the end cover 30, thereby efficiently cooling the heat generated from the integrated circuit device 23. The edge portions 25 are formed on the edges of the printed circuit board 20 and are not limited in shape if they can be inserted into the seating grooves 12 of the housing 10. In FIG. 1, the edge portions 25 have round arc-like shapes capable of being fixed to the seating grooves 12.

The end cover 30 is coupled to the top portion of the housing 10 in such a manner as to cover the top portion of the printed circuit board 20. The coupling is not specially limited, but desirably is carried out by means of forced fitting. The end cover 30 has the motor shaft coupling portion 31 formed on the center thereof. The motor shaft is disposed inside the motor shaft coupling portion 31 and has a bearing (not shown) mounted therealong so as to rotate gently.

Figure 2:
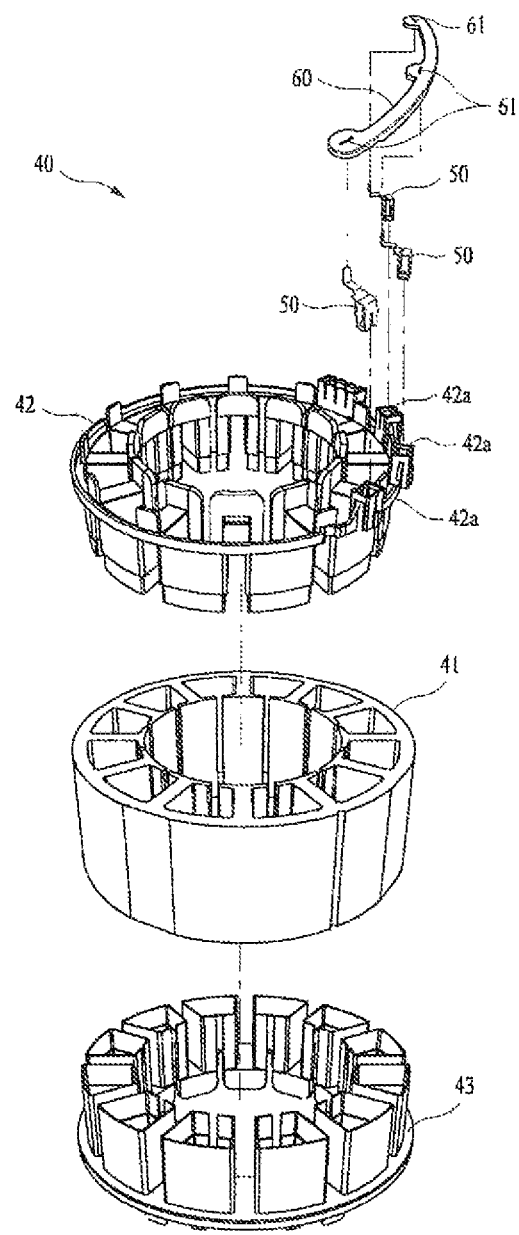
FIG. 2 is an exploded perspective view showing a stator assembly of the motor according to the present invention.

FIG. 2 is an exploded perspective view showing a stator assembly in the motor according to the present invention.

A stator assembly 40 as shown in FIG. 2 is located inside the housing 10. That is, the insert injection molding is carried out in the state where the stator assembly 40 is located in a mold, thereby making the housing 10. As shown in FIG. 2, the stator assembly 40 includes a stator core 41, an upper insulator 42 adapted to be coupled to the upper portion of the stator core 41 and a lower insulator 43 adapted to be coupled to the lower portion of the stator core 41. In the state where the upper insulator 42 and the lower insulator 43 are coupled to the stator core 41, coils are wound. If the coils having the phases u, v and w are wound, one side ends of the coils are connected to a common terminal, and the other side ends thereof are connected to respective mag mates 42a. The mag mates 42a are disposed on the upper insulator 42 in such a manner as to insert mag mate terminals 50 thereinto. A detailed structure of the mag mate terminals 50 will be explained with reference to FIG. 3 as will be discussed later.

The mag mate terminals 50 are inserted into the respective mag mates 42a, and the protruded upper portions of the mag mate terminals 50 are inserted into pin slots 61 formed on a pin guide 60. The pin guide 60 serves to fix the positions of the mag mate terminals 50 upon the insert injection molding of the stator assembly 40.

Figure 3:
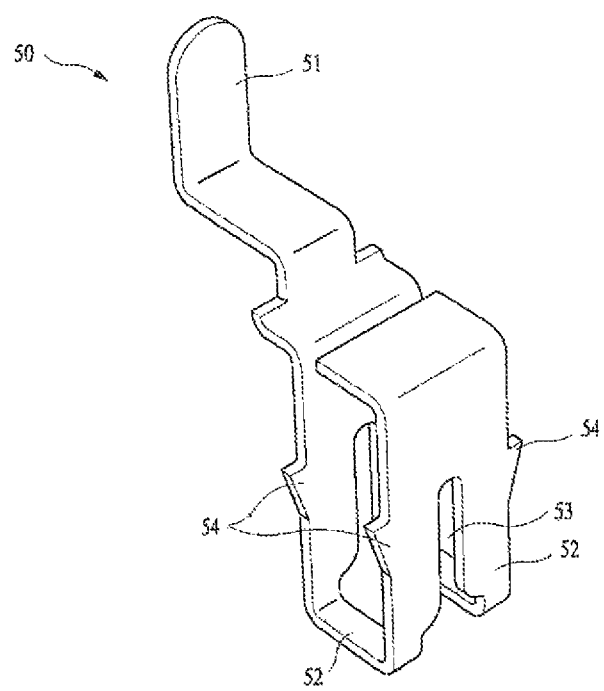
FIG. 3 is a perspective view showing one mag mate terminal in the motor according to the present invention.

FIG. 3 is a perspective view showing one mag mate terminal in the motor according to the present invention.

As shown in FIG. 3, each of the mag mate terminals 50 includes a power terminal pin 51 protruded from the upper portion thereof, a mag mate insertion portion 52 adapted to be inserted into the mag mate 42a, a coil connection slot 53 through which the coil is insertedly coupled and fixed, and hooks 54 adapted to prevent the upward deviation when coupled to the mag mate 42a.

FIG. 4 is a perspective view showing one power terminal connector in the motor according to the present invention.

As shown in FIG. 4, the power terminal connector 70 is insertedly fixed to each of the power terminal pin holes 22 of the printed circuit board 20 and is coupled to the power terminal pin 51 of the mag mate terminal 50, thereby performing the electrical connection. Accordingly, the power terminal connector 70 has a connection portion 71 electrically connected to the printed circuit board 20. An insertion portion 72 of the power terminal connector 70 is inserted into the power terminal pin hole 22, and a pin pressing and fitting portion 73 is formed inside the insertion portion 72. The pin pressing and fitting portion 73 serves to press and fit the power terminal pin 51. A fixing hole 74 is formed on the connection portion 71 and serves to increase the coupling force through a screw or a separate fixing member when the power terminal connector 70 is coupled to the printed circuit board 20.

Figure 5:
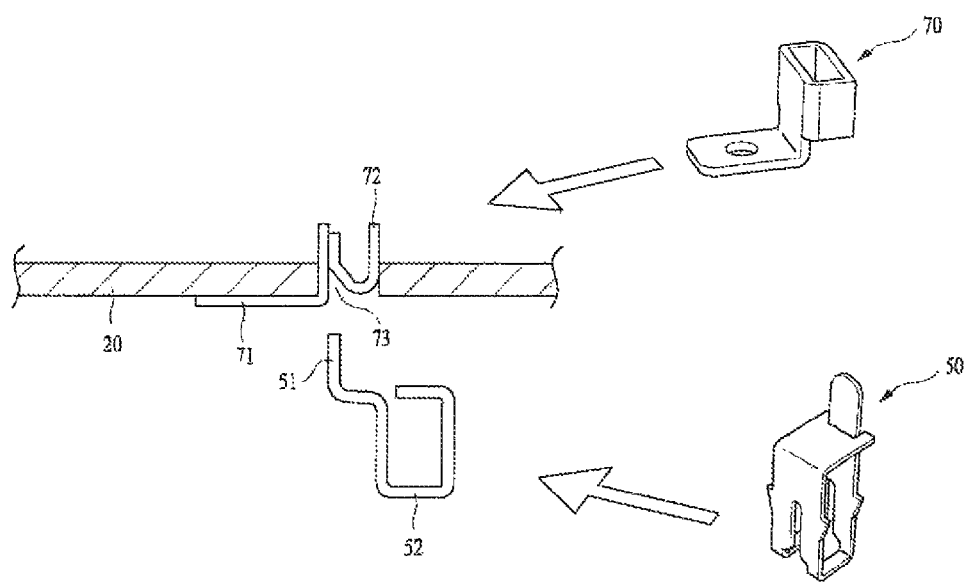
FIG. 5 is a conceptual view showing a state where the power terminal pin of the mag mate terminal is inserted into the power terminal connector mounted on a printed circuit board in the motor according to the present invention.

FIG. 5 is a conceptual view showing a state where the power terminal pin of the mag mate terminal is inserted into the power terminal connector mounted on a printed circuit board in the motor according to the present invention.

As shown in FIG. 5, the power terminal connector 70 is inserted into the power terminal pin hole 22 of the printed circuit board 20. The connection portion 71 of the power terminal connector 70 is electrically connected to the lead wire of the printed circuit board 20 and is fixed to the printed circuit board 20.

The insertion portion 72 of the power terminal connector 70 is located into the power terminal pin hole 22, and the pin pressing and fitting portion 73 thereof has a shape capable of pressing and fitting the power terminal pin 51. As shown in FIG. 5, the pin pressing and fitting portion 73 is bent to have a U-like shape at the inner side thereof, and one side of the U-like shape is formed brought into contact with the inner side of the power terminal pin 51, such that if the power terminal pin 51 is inserted into the pin pressing and fitting portion 73, the electrical connection between them can be conducted with the pressure applied through the U-like shape of the pin pressing and fitting portion 73. The mag mate insertion portion 52 of the mag mate terminal 50 is inserted into the mag mate 42a of the stator assembly 40.

As described above, the motor according to the present invention achieves easy assembly, reduces manufacturing cost, is simple in structure, and enhances heat radiation efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A motor comprising:
    a stator assembly including:
        a stator core;
        an upper insulator adapted to be coupled to an upper side of the stator core and having a plurality of mag mates disposed on one side of a top portion thereof and connected to coils; and
        a lower insulator adapted to be coupled to a lower side of the stator core;
    a plurality of mag mate terminals each inserted into each mage mate and each having a power terminal pin at a top portion thereof;
    a housing in which the stator assembly is located, wherein the housing is formed by an insert injection molding performed in a state that the stator assembly is located in a mold, wherein a plurality of power terminal pins of the plurality of mag mate terminals are exposed;
    a pin guide coupled to the plurality of mag mate terminals to fix positions of the plurality of mag mate terminals while the insert injection molding is performed, wherein the pin guide includes a plurality of pin slots and each of the plurality of power terminal pins passes through each of the plurality of pin slots;
    a printed circuit board adapted to mount an integrated circuit device thereon and having a shaft insertion hole formed at a center thereof and power terminal pin holes formed at the corresponding positions to the plurality of power terminal pins so that each of the plurality of power terminal pins is coupled to each of the power terminal pin holes; and
    an end cover adapted to be coupled to the housing in such a manner as to be located on a top of the printed circuit board and having a motor shaft coupling portion formed at a center thereof.

2. The motor according to claim 1, further comprising power terminal connectors adapted to be inserted into the power terminal pin holes, each power terminal connector comprising:
    an insertion portion coupled to each power terminal pin hole;
    a connection portion electrically connected to the insertion portion and the printed circuit board; and
    a pin pressing and fitting portion formed inside the insertion portion so as to press and fit each power terminal pin.

3. The motor according to claim 1, wherein the printed circuit board further comprises a thermal conductor disposed on a top of the integrated circuit device and being in contact with the end cover.

4. The motor according to claim 1, wherein the housing comprises seating grooves formed along an inner peripheral wall of an upper portion of the housing in such a manner as to fixedly insert edge portions of the printed circuit board thereinto.

5. A method for manufacturing a motor, comprising the steps of:
    providing a stator assembly having mag mates disposed on one side thereof and mag mate terminals adapted to be inserted into the mag mates;
    providing a pin guide coupled to the mag mate terminals and having pin slots through which protruded upper portions of the mag mate terminals are inserted;
    disposing the stator assembly into a mold and performing an insert injection molding to form a housing which encloses the stator assembly, wherein the pin guide fixes positions of the mag mate terminals while performing the insert injection molding;
    coupling a printed circuit board to the housing, wherein the printed circuit board has pin holes and the protruded upper portions of the mag mate terminals are coupled to the pin holes; and
    coupling an end cover to the housing to cover an open end of the housing.

* * * * *